(12) United States Patent
Reznar

(10) Patent No.: US 8,458,862 B2
(45) Date of Patent: Jun. 11, 2013

(54) LOCKED BASE TRIM CLIP

(75) Inventor: Jason Reznar, Redford, MI (US)

(73) Assignee: Tinnerman Palnut Engineered Products, Inc., Brunswick, OH (US)

( * ) Notice: Subject to any disclaimer, the term of this patent is extended or adjusted under 35 U.S.C. 154(b) by 267 days.

(21) Appl. No.: 12/609,107

(22) Filed: Oct. 30, 2009

(65) Prior Publication Data
US 2010/0107372 A1   May 6, 2010

Related U.S. Application Data

(60) Provisional application No. 61/197,807, filed on Oct. 30, 2008.

(51) Int. Cl.
| F16B 2/22 | (2006.01) |
| F16B 5/06 | (2006.01) |
| F16B 21/08 | (2006.01) |
| F16B 2/24 | (2006.01) |

(52) U.S. Cl.
USPC ............... 24/292; 24/458; 24/293; 24/295

(58) Field of Classification Search
USPC ............... 24/289, 292, 293, 295, 297, 458
See application file for complete search history.

(56) References Cited

U.S. PATENT DOCUMENTS

| 3,977,048 | A | * | 8/1976 | Benedetti ................. 24/293 |
| 4,630,338 | A |   | 12/1986 | Osterland et al. |
| 5,517,731 | A | * | 5/1996 | Spykerman ............. 24/295 |
| 6,101,686 | A | * | 8/2000 | Velthoven et al. ......... 24/295 |
| 6,141,837 | A |   | 11/2000 | Wisniewski |
| 6,154,933 | A | * | 12/2000 | Vetter et al. ............. 24/295 |
| 6,279,207 | B1 |   | 8/2001 | Vassiliou |
| 6,353,981 | B1 | * | 3/2002 | Smith ..................... 24/295 |
| 6,691,380 | B2 | * | 2/2004 | Vassiliou ................. 24/295 |
| 6,718,599 | B2 |   | 4/2004 | Dickinson et al. |
| 6,868,588 | B2 | * | 3/2005 | Dickinson et al. ........ 24/295 |
| 7,188,392 | B2 | * | 3/2007 | Giugliano et al. ........ 24/295 |
| 7,428,770 | B2 | * | 9/2008 | Dickenson et al. ....... 24/295 |
| 2003/0024078 | A1 | * | 2/2003 | Vassiliou ............... 24/295 |
| 2008/0174151 | A1 | * | 7/2008 | Dickenson et al. ...... 296/204 |

OTHER PUBLICATIONS

International Search Report and Written Opinion, Tinnerman Palnut Engineered Products, Inc., Oct. 30, 2009.

* cited by examiner

*Primary Examiner* — Robert J Sandy
*Assistant Examiner* — David Upchurch
(74) *Attorney, Agent, or Firm* — McDonald Hopkins, LLC

(57) ABSTRACT

A locked base trim clip is described. The trim clip may secure two or more components together, such as a blade and a panel. The trim clip may include an outer frame having a top portion and a base portion. The base portion may be capable of engagement with a first component. The trim clip may include at least one tongue that may extend outward from the top portion and may engage with a second component. The trim clip may include at least one tab extending outward from the base portion that may engage the first component. The trim clip may include at least one locking feature that may include an inner U-portion and an outer U-portion. The locking feature may increase the ratio of insertion to retention within the second component to be greater than 1:2 or 1:3.

20 Claims, 4 Drawing Sheets

LOCKED BASE TRIM CLIP

CROSS-REFERENCE TO RELATED APPLICATION

This application claims benefit from U.S. Provisional Patent Application No. 61/197,807, entitled "Locked Base Trim Clip," filed on Oct. 30, 2008, which is hereby incorporated in its entirety by reference.

FIELD OF INVENTION

The present invention generally relates to fasteners and, more particularly, to a clip for securing one or more components together.

BACKGROUND

It is well known to utilize fasteners, such as trim clips, for securing a variety of different types of components together. During the installation, it may be necessary to secure two or more of these components together. Many difficulties may be encountered during the manufacture and assembly of components. For example, various components of products may require numerous and different types of tools in order to assemble the components together. As a result, the use of these numerous tools may be time consuming and costly for manufacturers.

Moreover, the installation of some components may be difficult due to limited access, such as access on only one side of the components. It may be desirable to provide consumers with access to a fastener that may secure the components. For example, a consumer may need access to be able to repair the components, repair the fastener, exchange the components, clean the components, or for other similar reasons. In order to improve efficiency during manufacture, improved fastening devices are needed. In addition, typical trim clip applications have a 1:1 ratio of insertion into the panel opening, versus retention into the panel opening. The U-portion of typical U-style trim clips may open up during retention testing, which limits the amount of retention force to the blade.

Therefore, there is a need in the art to provide an improved and easy to use trim clip that mechanically locks the trim clip at the base of the u-nut and increases the ratio of insertion to retention ratios to the panel slot.

SUMMARY

A locked base trim clip is described. The trim clip may secure two or more components together, such as a blade and a panel. The trim clip may include an outer frame having a top portion and a base portion. The base portion may be capable of engagement with a first component. The trim clip may include at least one tongue that may extend outward from the top portion, wherein the tongue may be capable of engagement with a second component. The trim clip may include at least one tab extending outward from the base portion, wherein the tab may be capable of engagement with the first component. The trim clip may include at least one locking feature located on the outer frame. The locking feature may include an inner U-portion and an outer U-portion that may be capable of engagement with the inner U-portion. The locking feature may be capable of engagement around the first component. The locking feature may increase the ratio of insertion to retention within the second component to be greater than 1:2 or 1:3.

DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A locked base trim clip 10 is illustrated in FIGS. 1-10. The trim clip 10 may be attachable to one or more components without the use of tools, be installed quickly to reduce manufacturing time and expense, as well as have the ability to be used in a variety of applications, such as in an automotive setting for interior and exterior trim components. For example, the trim clip 10 may be utilized for fastening a trim appliqué onto deck lid.

Figure 1:
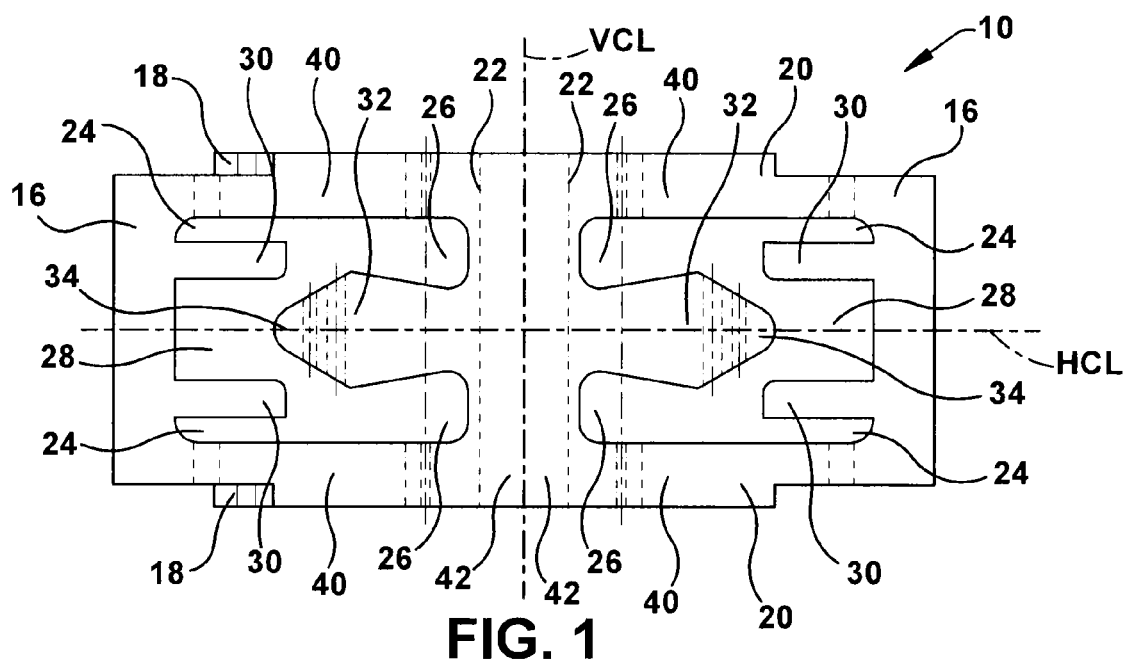
FIG. 1 illustrates a top view of a blank of a locked base trim clip in an embodiment of the present invention.

FIG. 1 illustrates a blank of the trim clip 10. The trim clip 10 blank may be of any appropriate shape and size, but is preferably of a generally rectangular shape and approximately 40 mm long by approximately 15.5 mm wide. The trim clip 10 may also be constructed from a variety of appropriate materials. The trim clip 10 may be constructed out of a metal material, such as SAE 1050-1065 steel.

Figure 2:
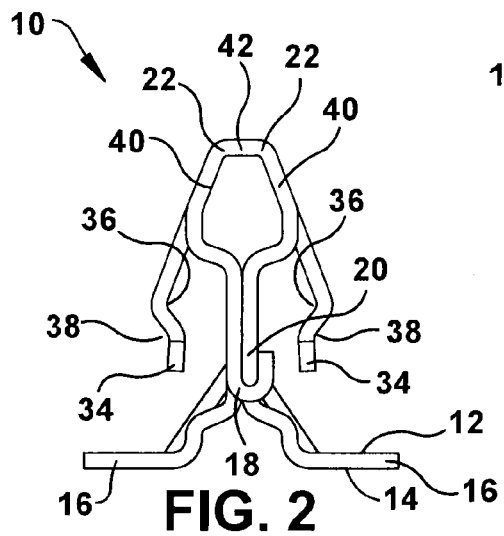
FIG. 2 illustrates a side view of the trim clip.

The locked base trim clip 10 may include a top side 12 and a bottom side 14 (FIG. 2). Each side of the locked base trim clip 10 may generally be a substantial mirror image of the other (FIGS. 1-4). The trim clip 10 may be a substantial mirror image of itself along a horizontal center line HCL, and may also be a substantial mirror image of itself along a vertical center line VCL (FIG. 1). The only major difference of the trim clip 10 between either side of the vertical center line VCL may be that one side may include an outer U-portion 18 and the other side may include an inner U-portion 20. While the trim clip 10 is shown and discussed herein as being a substantial mirror image of itself, it is to be understood that each side of the trim clip 10 could be nearly identical to itself or could vary in any appropriate manner and should not be limited to that described herein.

Figure 5:
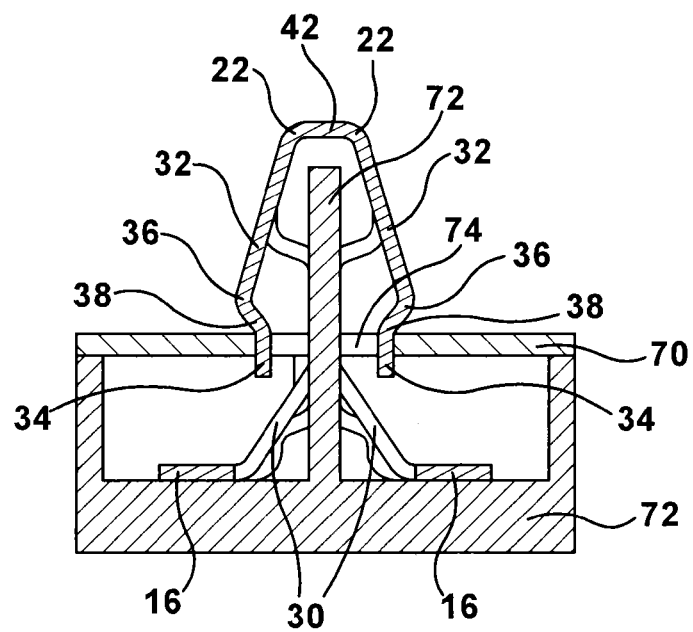
FIG. 5 illustrates a side sectional view of an embodiment of an assembly of the trim clip.
Figure 6:
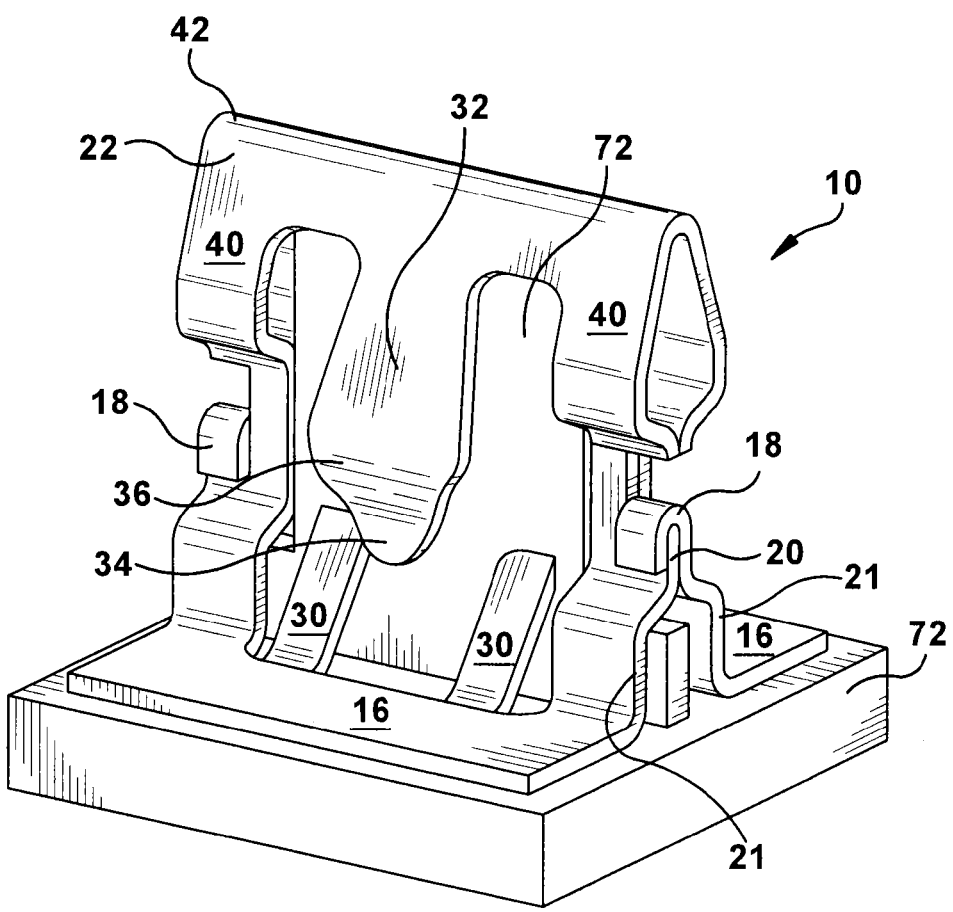
FIG. 6 illustrates a perspective view of an embodiment of an assembly of the trim clip.

With further reference to FIG. 1, the trim clip 10 may include a base portion 16, an outer frame 40 and a top portion 42. The base portions 16 may be located at the outer end of either side of the trim clip 10. The base portions 16 of the trim clip 10 may provide a general bottom structural portion. The base portions 16 may be of any appropriate size or shape, but are preferably of a generally rectangular shape that may provide a solid base for the trim clip 10 to rest on top of the blade 72 (FIGS. 5 and 6).

The vertical center line VCL may be located in the approximate center of the top portion 42, for example. The outer frame 40 of the trim clip 10 may provide a general structural side portion for the trim clip 10. The top portion 42 of the trim clip 10 may provide a general structural upper portion, when formed. The outer U-portions 18 and inner U-portions 20 may be located at any appropriate position on the trim clip 10. For example, the outer U-portion 18 and inner U-portion 20 may be located toward the ends of the outer frame 40 and towards the base portion 16.

The top portion 42 may also include at least one fold area or line 22. While the trim clip 10 is shown and described as having two fold lines 22, it is to be understood that the trim clip 10 should not be limited as having two fold lines 22 and could have any appropriate number of fold lines 22. The fold lines 22 may be located at any appropriate location on the trim clip 10, such as being located near the outer edges of the top portion 42 (FIG. 1). For example, the top portion 42 may include one fold line located on either side of the top portion 42 and the vertical center line VCL.

The fold lines 22 may allow for the locked base trim clip 10 to be formed and bent in any appropriate direction. For example, the fold lines 22 may allow for the trim clip 10 to be formed in a generally downward direction so that each side of the trim clip 10 may form a general mirror image of the other along the vertical center line VCL once formed (see FIGS. 2, 4, and 5).

The trim clip may also include a tongue 32. The tongue 32 may be of any appropriate shape or size, such as a generally rectangular, ovular, or diamond shape. The tongue 32 may be located at any appropriate position on the trim clip 10. For example, the tongue 32 may extend outward from the top portion 42 towards either base portion 16. The trim clip 10 may also include at least one upper slot 26. The upper slots 26 may be of any appropriate shape or size and be located at any appropriate position on the trim clip 10. For example, the tongue 32 may be positioned between the upper slots 26 located on either side of the tongue 32.

The tongue 32 may also include an inserted portion 34, a projection 36 and a recess 38 (FIGS. 2 and 5). The inserted portions 34 may be of any appropriate shape, such as a generally rectangular, ovular or triangular shape. The inserted portions 34 may be positioned at any appropriate location on the tongue 32. For example, once the trim clip 10 is formed, the inserted portions 34 may be located at the tip of the tongue 32 towards the base portions 16 and the panel 70 (FIGS. 2 and 5).

The recesses 38 may be located at any appropriate position on the tongue 32, such as adjacent to the inserted portions 34 and adjacent to the projections 36. For example, the recesses 38 may be located between the inserted portions 34 and the projections 36 (FIGS. 2 and 5). The recesses 38 may be of any appropriate shape or size, such as a generally curved shape to provide a transition between the inserted portions 34 and the projections 36.

The projections 36 may be located at any appropriate position on the tongue 32, such as being located towards the inserted portions 34 of the tongue 32 and adjacent to the recesses 38. The projections 36 may thereby create a stepped area that may rest on top of the panel 70. The projections 36 may be of any appropriate shape or size, such as a generally curved shape that may abut or rest on top of the panel 70. This formation of the tongues 32, including the inserted portions 34, recesses 38 and projections 36, provides for an appropriate shape to be inserted into a panel opening 74 in the panel 70.

The trim clip 10 may be inserted into the panel opening 74. After the trim clip 10 is inserted into the panel opening 74, the inserted portions 34 may push outward towards the panel opening 74, thereby maintaining the trim clip 10 in place within the panel opening 74. The typical insertion force in a 6 mm wide panel opening 74 may be greater than or equal to ten pounds. The typical retention force in a 6 mm wide panel opening 74 may be greater than thirty pounds or more.

The trim clip 10 may include a base opening 28. The base opening 28 may be of any appropriate shape or size. The trim clip 10 may include at least one lower slot 24. For example, the trim clip 10 may include two lower slots 24 on each side. The lower slots 24 may be of any appropriate shape or size, such as a generally rectangular shape. The lower slots 24 may be located at any appropriate position on the trim clip 10.

Figure 3:
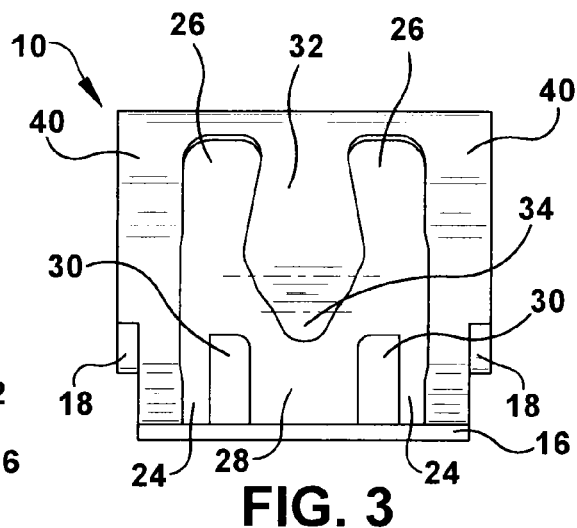
FIG. 3 illustrates a front view of the trim clip of FIG. 2.
Figure 4:
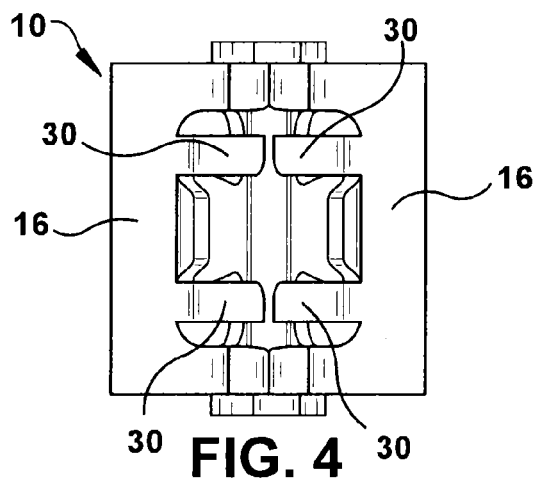
FIG. 4 illustrates a bottom view of the trim clip of FIG. 2.

The locked base trim clip 10 may also include at least one lower tab 30. For example, the trim clip 10 may include two lower tabs 30 on each side. The lower tabs 30 may be of any appropriate shape or size, such as a generally rectangular or triangular shape. The lower tabs 30 may be located at any appropriate position on the trim clip 10. For example, the lower tabs 30 may extend toward the tongue 32 and away from the base portion 16 (FIGS. 1, 3 and 4). The lower tabs 30 may be located on either side of a base opening 28.

The lower tabs 30 may be positioned between the base opening 28 and the lower slot 24, whereby the lower slots 24 may be located between the lower tab 30 and the outer frame 40 (see FIGS. 1 and 3). When assembled, the lower tabs 30 may rest and push on the blade 72 and may provide an added retention force (FIGS. 5 and 6).

Once the trim clip 10 is formed, the outer U-portion 18 may be secured around the inner U-portion 20, thereby locking the trim clip 10 at the base of the U-portion 18. The outer U-portions 18 and inner U-portions 20 of the trim clip 10 may be secured by any appropriate means, such as by mechanically locking the U-portions 18, 20 of the clip 10 together. For example, the outer U-portion 18 being wrapped around the inner U-portion 20 (FIG. 2). As an alternative, the outer U-portion 18 may be formed around the inner U-portion 20 in the opposite manner and may include a stepped portion 21 generally surrounding the blade 72 (FIG. 6). Typical trim clips may have a clip that has an open U-portion of the trim clip. That is, the U-portion 18 may be formed on top of the inner U-portion 20 instead of around the bottom of the inner U-portion 20 (FIG. 2).

Figure 7:
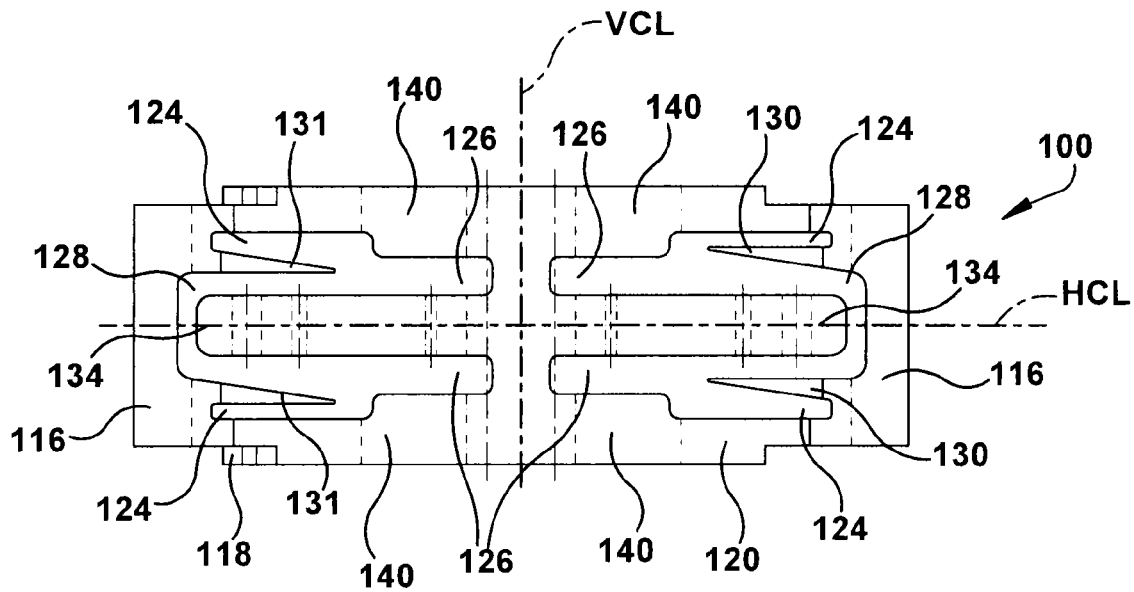
FIG. 7 illustrates a top view of a blank of a locked base trim clip.
Figure 8:
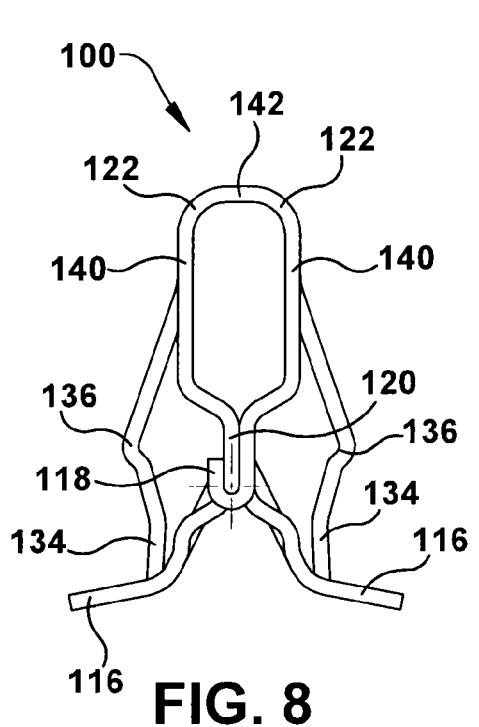
FIG. 8 illustrates a side view of the trim clip.
Figure 9:
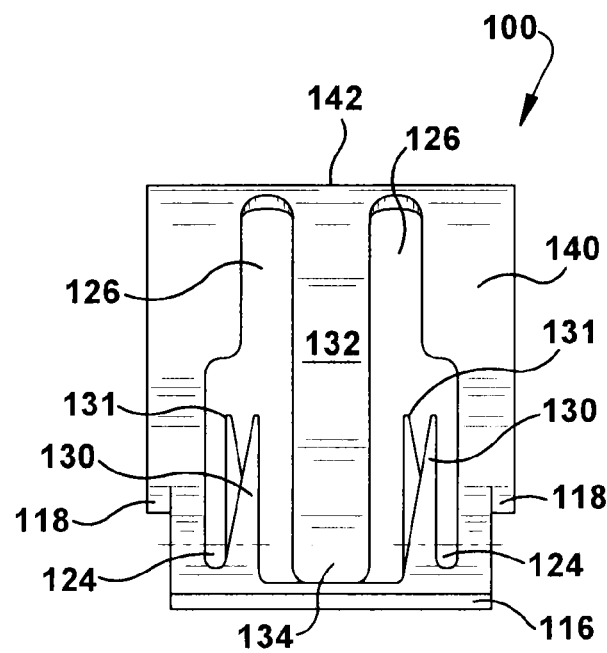
FIG. 9 illustrates a front view of the trim clip of FIG. 8.

FIGS. 7-10 illustrate an alternative embodiment of a locking base trim clip 100. A blank of the trim clip 100 is illustrated in FIG. 7. Each side of the locked base trim clip 100 may generally be a substantial mirror image of the other (FIGS. 7-9). The trim clip 100 may be an approximate mirror image of itself along a horizontal center line HCL, and may also be an approximate mirror image of itself along a vertical center line VCL (FIG. 7). While the trim clip 100 is shown and discussed herein as being a substantial mirror image of itself, it is to be understood that each side of the trim clip 100 could be nearly identical to itself or could vary in any appropriate manner and should not be limited to that described herein.

The trim clip 100 may include a base portion 116, an outer frame 140 and a top portion 142 (FIGS. 7-9). Similar to the trim clip 10 discussed above, the top portion 142 may be formed along two bend lines 122. The bend lines 122 may be located on either side of the top portion 142. The base portions 116 may be located at the outer end of either side of the trim clip 100. The base portions 116 of the trim clip 100 may provide a general bottom structural portion. The base portions 116 may be of any appropriate size or shape, but are preferably of a generally rectangular shape that may provide a solid base for the trim clip 100.

One of the minor differences of the trim clip 100 between either side of the vertical center line VCL may be that one side may include an outer U-portion 118 and the other side may include an inner U-portion 120. The outer U-portions 118 and the inner U-portions 120 that may be "locked" together when the outer U-portion 118 is wrapped around the inner U-portion 120 (FIGS. 8 and 10).

The trim clip 100 may include a tongue 132. The tongue 132 may be of any appropriate shape or size, such as a generally rectangular, ovular, or diamond shape. The tongue 32 may be located at any appropriate position on the trim clip 100. For example, the tongue 132 may extend outward from the top portion 142 towards either base portion 116. The tongues 132 may extend almost all the way to the base portions 116 (FIGS. 8, 9 and 10).

The trim clip 100 may include at least one upper slot 126. For example, the trim clip 100 may include two upper slots 126. The upper slots 126 may be located on either side of the tongue 132. The upper slots 126 may be of any appropriate shape or size and be located at any appropriate position on the trim clip 100. For example, the tongue 132 may be positioned between the upper slots 126 located to either side of the tongue 132.

Figure 10:
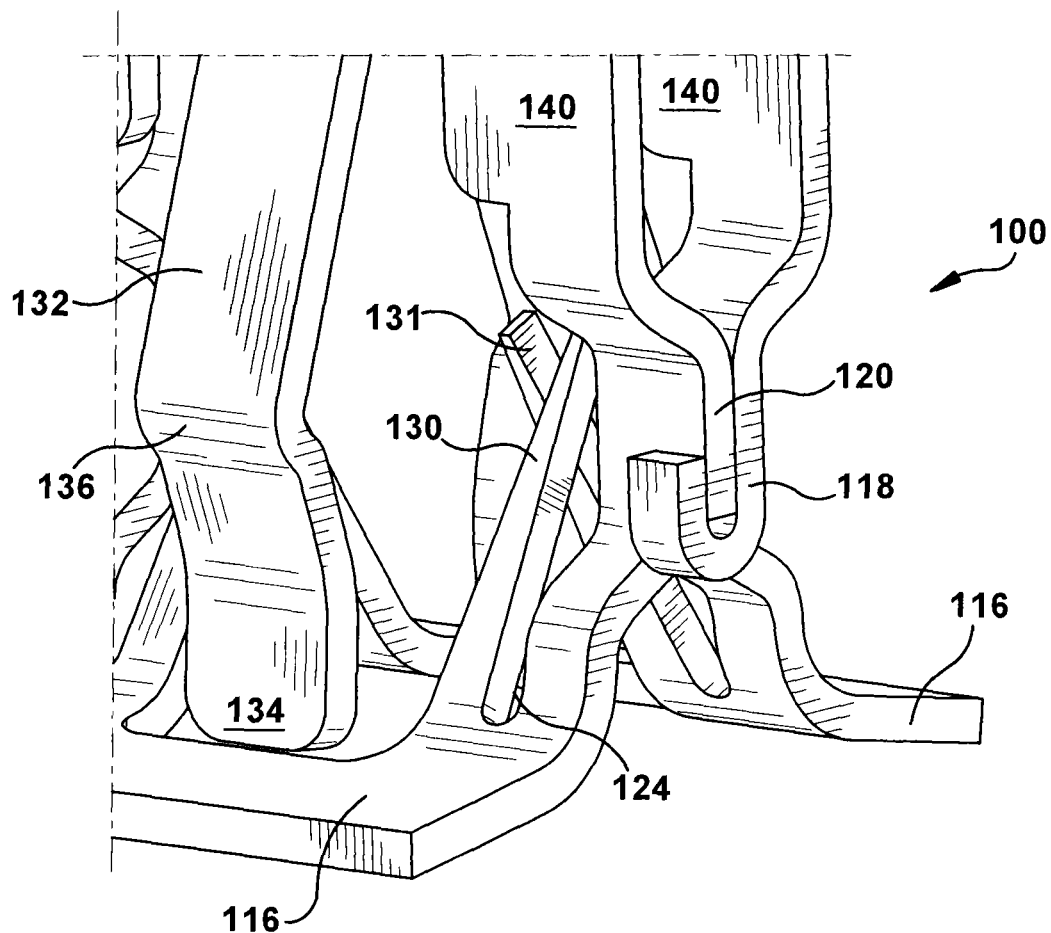
FIG. 10 illustrates a detailed perspective view of the trim clip of FIG. 8.

The tongue 132 may include an inserted portion 134 and a projection 136 (FIGS. 8 and 10). The inserted portions 134 may be of any appropriate shape, such as a generally rectangular, ovular or triangular shape. The inserted portions 134 may be positioned at any appropriate location on the tongue 132. For example, once the trim clip 100 is formed, the inserted portions 134 may be located at the tip of the tongue 132 towards the base portions 116.

The projections 136 may be located at any appropriate position on the tongue 132, such as being located towards the inserted portions 134 of the tongue 132. The projections 136 may thereby create a stepped area that may rest on top of the panel 70. The projections 136 may be of any appropriate shape or size, such as a generally curved shape that may abut or rest on top of the panel 70. This formation of the tongues 132, including the inserted portions 134 and projections 136, may provide for an appropriate shape to be inserted into a panel opening 74 in the panel 70.

The locked base trim clip 100 may also include at least one lower tab. For example, the trim clip 100 may include two lower tabs 130, 131 on each side (FIGS. 7, 9 and 10). The lower tabs 130, 131 may be of any appropriate size or shape, such as a generally rectangular or triangular shape. The lower tabs 130, 131 may be located at any appropriate position on the trim clip 100. For example, the lower tabs 130, 131 may extend towards the top portion 142 and away from the base portion 116.

The trim clip 100 may include a base opening 128. The base opening 128 may be of any appropriate shape or size. The trim clip 100 may include at least one lower slot 124. For example, the trim clip 100 may include two lower slots 124 on each side. The lower slots 124 may be of any appropriate shape or size, such as a generally rectangular or triangular shape. The lower slots 124 may be located at any appropriate position on the trim clip 100.

The lower tabs 130, 131 may be located on either side of the base opening 128, whereby the lower tabs 130, 131 may be positioned between the base opening 128 and the lower slot 124. The lower slots 124 may be located between the lower tabs 130, 131 and the outer frame 140 (see FIGS. 7 and 9). The tongues 132 may also be positioned between the lower tabs 130, 131. When assembled, the lower tabs 130, 131 may rest and push on the blade 72 and may provide an added retention force.

One minor difference between either side of the vertical center line VCL and also the horizontal center line HCL may be that the location and shape of the lower tabs 130, 131. The location of the lower tabs 130, 131 may create a general criss-cross effect of when they are not engaged with a blade 72 (FIGS. 9 and 10).

Typical trim clip applications may have a 1:1 ratio of insertion into the panel opening 74 versus retention into the panel opening 74. The locked base trim clip 10, 100 may have a mechanical "locking" feature via the outer U-portion 18, 118 and inner U-portion 20, 120 that may "lock" both sides of the clip 10, 100 around the outside of the blade 72 feature. This "locking" feature of the U-portions 18, 20, 118, 120 may increase the retention of the trim clip 10, 100 to the blade 72 that may allow the insertion to retention ratios to the panel opening 74 to increase.

For example, the ratio of insertion to retention ratios to the panel slot greater than 1:2 or 1:3. During retention testing, the clip 10, 100 may increase retention to the blade 72 by preventing the U-portions 18, 20, 118, 120 from separating. The clip 10, 100 may also provide an increase of retention force at the panel opening 74. As an alternative, the clip 10, 100 may be installed onto the blade 72 utilizing an automated hand tool.

In typical U-style trim clips, the U-portion of the clip may open up during retention testing, which may limit the amount of retention force to the blade 72. By "locking" the inner and outer U-portions 18, 20, 118, 120 together, the retention of the clip 10, 100 to the blade 72 is increased, which allows the retention of the panel opening 74 to be increased to much greater amounts than typical trim clips.

The embodiments of the invention have been described above and, obviously, modifications and alternations will occur to others upon reading and understanding this specification. The claims as follows are intended to include all modifications and alterations insofar as they come within the scope of the claims or the equivalent thereof.

Having thus described the invention, I claim:

1. A trim clip for securing first and second components together, said trim clip comprising:
    an outer frame having a top portion, first and second side portions, and at least one base portion, wherein said base portion engages the first component;
    at least one tongue extending outward from said top portion, wherein said tongue engages with the second component;
    at least one tab extending outward from said base portion, wherein said tab engages with and applies a retention force to the first component; and
    at least one locking feature located on said outer frame, said locking feature including a stepped portion, wherein said locking feature generally retains said first and second side portions in a locked position in proximity to each other whereby said stepped portion generally surrounds at least a portion of the first component and wherein said locking feature increases said retention force said at least one tab applies to the first component.

2. The trim clip of claim 1, wherein said locking feature comprises:
    an inner member; and an outer generally U-shaped member engaged with said inner member.

3. The trim clip of claim 1, wherein said tongue includes a protrusion that is capable of engagement with the second component.

4. The trim clip of claim 2, wherein said outer frame includes two locking features.

5. The trim clip of claim 1, wherein said tab is triangular in shape.

6. The trim clip of claim 1, wherein said top portion includes two tongues extending therefrom.

7. The trim clip of claim 1, wherein said base portion includes two tabs extending therefrom.

8. The trim clip of claim 7, wherein said tongue is located between said tabs.

9. A trim clip for securing a blade to a panel, said trim clip comprising:
- a body including a first side and a second side located between a fold area, wherein either of said first or second sides engages the blade;
- at least one tab extending outward from said body, wherein said tab retains the blade within said body;
- a locking feature located on said body generally retaining said first and second sides in a locked position in proximity to each other and increasing a retention force applied by said at least one tab in retaining the blade, said locking feature comprising:
- a stepped portion;
- an inner member extending from said stepped portion;
- an outer U-shaped member extending from said stepped portion, said outer U-shaped member engaged with said inner member;
- wherein said stepped portion of said locking feature generally surrounds at least a portion of the blade; and
- a tongue attached to each of said first and second sides, said tongues capable of engagement with the panel.

10. The trim clip of claim 9, wherein said body includes at least one base portion.

11. The trim clip of claim 10, wherein said base portion includes said at least one tab.

12. The trim clip of claim 11, wherein said base portion engages with the blade.

13. The trim clip of claim 9, wherein said tongue includes a protrusion that is capable of engagement with the panel.

14. The trim clip of claim 9, wherein said body includes two locking features.

15. The trim clip of claim 14, wherein said locking features increase a ratio of insertion to retention of the blade to be greater than 1:2.

16. The trim clip of claim 14, wherein said locking features increase a ratio of insertion to retention of the blade to be greater than 1:3.

17. A trim clip for securing a blade to a panel, said trim clip comprising:
- a body having first and second sides, wherein at least one of said first and second sides engages the blade;
- at least one base portion included on said body;
- at least one tab extending from said base portion, wherein said tab engages the blade and applies a retention force on the blade;
- a locking feature positioned on said body, said locking feature including a stepped portion, wherein said locking feature generally retains said first and second sides in a locked position in proximity to each other whereby said stepped portion generally surrounds at least a portion of the blade and wherein said locking feature increases said retention force applied by said tab; and
- at least one tongue extending outward from said body, wherein said tongue engages the panel.

18. The trim clip of claim 17, wherein said tongue includes a protrusion that engages with the panel.

19. The trim clip of claim 17, wherein said locking feature further comprises:
- an inner member extending from said stepped portion; and
- an outer U-shaped member extending from said stepped portion, the outer U-shaped member engaged with said inner member.

20. The trim clip of claim 19, wherein said locking feature comprises:
- a second inner member; and
- a second outer U-shaped member engaged with said second inner member.

* * * * *